(12) United States Patent
Uemura

(10) Patent No.: US 6,516,821 B1
(45) Date of Patent: Feb. 11, 2003

(54) STAGELESS ADJUSTING/LOCATING DEVICE FOR STICKS

(76) Inventor: Shinichi Uemura, 22-8 Uchihama-Cho, Mizuho-Ko, Nagoya (JP)

( * ) Notice: Subject to any disclaimer, the term of this patent is extended or adjusted under 35 U.S.C. 154(b) by 45 days.

(21) Appl. No.: 09/689,669

(22) Filed: Oct. 13, 2000

(51) Int. Cl.$^7$ ................................................ A61H 3/02
(52) U.S. Cl. ............................ 135/75; 135/65; 135/69; 135/139; 135/140; 135/141; 135/142; 403/104; 403/109.1; 403/109.5; 403/110; 403/350; 403/351
(58) Field of Search ............................. 135/65, 75, 69, 135/139, 140–142; 403/104, 109.1, 109.5, 110, 350, 351

(56) References Cited

U.S. PATENT DOCUMENTS

| | | | | |
|---|---|---|---|---|
| 5,482,070 A | * | 1/1996 | Kelly | 135/66 |
| 5,651,565 A | * | 7/1997 | Liu | 280/823 |
| 5,769,104 A | * | 6/1998 | Uemura | 135/69 |
| 6,202,663 B1 | * | 3/2001 | Uemura | 135/65 |
| 6,273,112 B1 | * | 8/2001 | Sumida | 135/75 |

* cited by examiner

*Primary Examiner*—Carl D. Friedman
*Assistant Examiner*—Christy Green

(57) ABSTRACT

A stageless adjusting/locating device for various kinds of sticks enables both right-handed user and left-handed users to conveniently stagelessly adjust the length of a stick. The stick is composed of multiple telescopic fitting tubes including mother fitting tubes and daughter fitting tubes nested in the mother fitting tubes. The adjusting/locating device is disposed at each of the mother and daughter fitting tubes. The adjusting/locating device includes a screw member formed by a threaded rod having outer threads and a locking member composed of two semicylindrical bodies mating with the threaded rod. A fastening ring is fixedly fitted around the locking member. The inner circumferential faces of the two semicylindrical bodies are formed with inner threads. An upper and a lower end of the inner threads are formed with thick sections converging from thin sections. The inner wall faces of the thick sections are formed with semielliptic arch faces. By rotating the daughter fitting tube in either a clockwise or a counterclockwise direction, the screw member is simultaneously rotated to expand the locking member so as to tightly abut against the inner circumferential face of the mother fitting tube and thus easily and reliably achieve an adjustment.

3 Claims, 8 Drawing Sheets

STAGELESS ADJUSTING/LOCATING DEVICE FOR STICKS

BACKGROUND OF THE INVENTION

The present invention relates to a stageless adjusting/locating device for adjusting/locating device for adjusting length of various kinds of sticks according to the configuration of a user, and more particularly to a stageless adjusting/locating device which enables both right-handed user and left-handed users to conveniently stagelessly adjust the length of the stick.

Japanese Publication No. 7-49004 discloses a stageless adjusting device for sticks. In this device, a screw body having a central conic body formed with a conic face is integrally disposed at the top end of a lower fitting tube of the stick. A resilient cylindrical locking body and an eccentrically rotatable circular plate are screwed around the screw body and an eccentrically rotatable circular plate are screwed around the screw body. When rotating the lower fitting tube, the circular plate is pressed against the inner circumferential face of the upper fitting tube. Simultaneously, the locking body is expanded by the screw body to tightly abut against the inner circumferential face of the upper fitting tube so as to lock the upper fitting tube with the lower fitting tube. Therefore, the length of the stick can be adjusted and fixed.

In the above prior art, the circular plate is necessary and the structure is complicated so that the manufacturing cost is relatively high. Moreover, the circular plate tends to detach from the locking body and can hardly be durably used.

In addition, according to the above conventional structure, the adjustment can be achieved only by means of rotating the lower fitting tube in a fixed direction which is generally suitable for right-handed users. Therefore, for a left-handed user, it is inconvenient to adjust the length of the stick.

SUMMARY OF THE INVENTION

It is therefore a primary object of the present invention to provide a stageless adjusting/locating device for adjusting the length of various kinds of sticks according to the configuration of a user. The stageless adjusting/locating device is designed such that by means of rotating the daughter fitting tube in both clockwise and counterclockwise directions, the daughter fitting tube can be firmly locked with the mother fitting tube. Therefore, for both right-handed user and left-handed users, the length of the stick can be conveniently and truly adjusted and fixed.

The present invention can be best understood through the following description and accompanying drawings wherein:

DETAILED DESCRIPTION OF THE PREFERRED EMBODIMENTS

Figure 1:
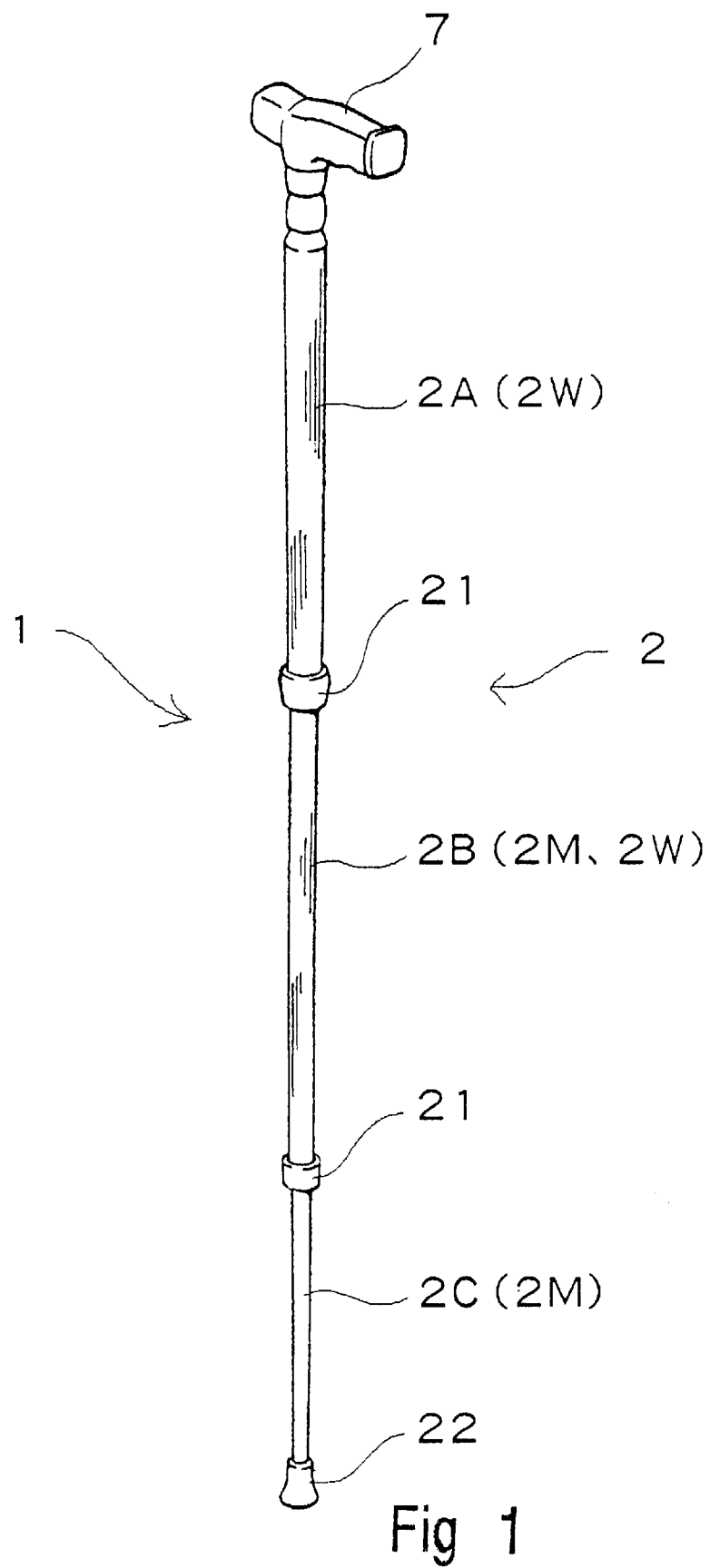
FIG. 1 is a perspective view of the stick of the present invention.

Please refer to FIG. 1 which shows the stageless adjusting/locating device for sticks according to the present invention. The stick 1 includes a main body 2 composed of an upper fitting tube 2A, a middle fitting tube 2B and a lower fitting tube 2C. A handle 7 is disposed at top end of the upper sleeve 2A. The middle fitting tube 2B is coaxially fitted with the lower end of the upper sleeve 2A. The lower fitting tube 2C is coaxially fitted with the lower end of the middle fitting tube 2B. The lower ends of the upper fitting tube 2A and the middle fitting tube 2B serve as mother fitting tubes 2W, while le the upper ends of the middle fitting tube 2B and the lower fitting tube 2C serve as daughter fitting tubes 2M nested into the mother fitting tubes 2W. A collar 21 fitted on the end of each mother fitting tube 2W. A retaining member 22 is disposed at the bottom end of the lower fitting tube 2C.

Figure 2:
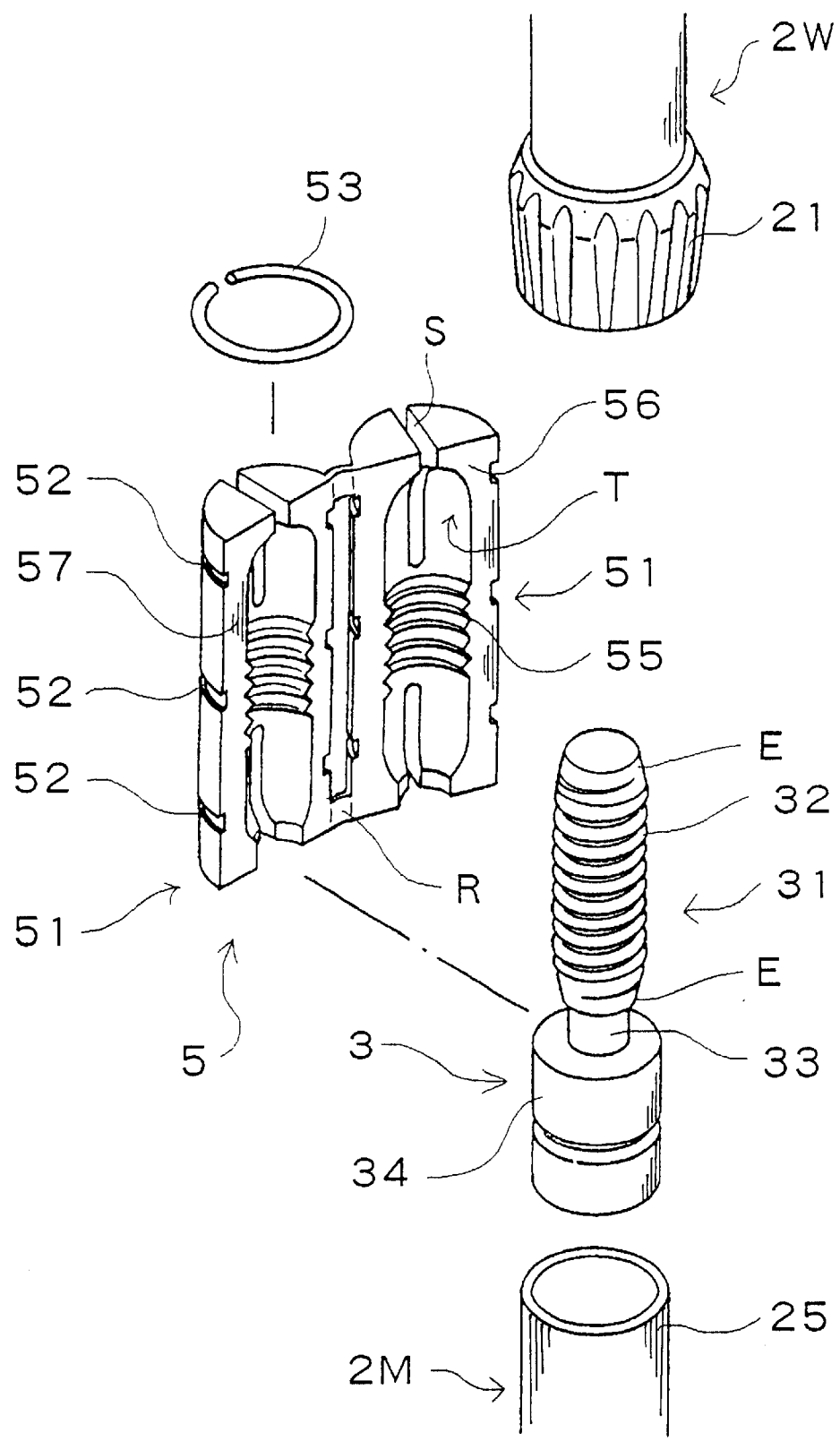
FIG. 2 is a perspective exploded view of the adjusting/locating device of the present invention.
Figure 3:
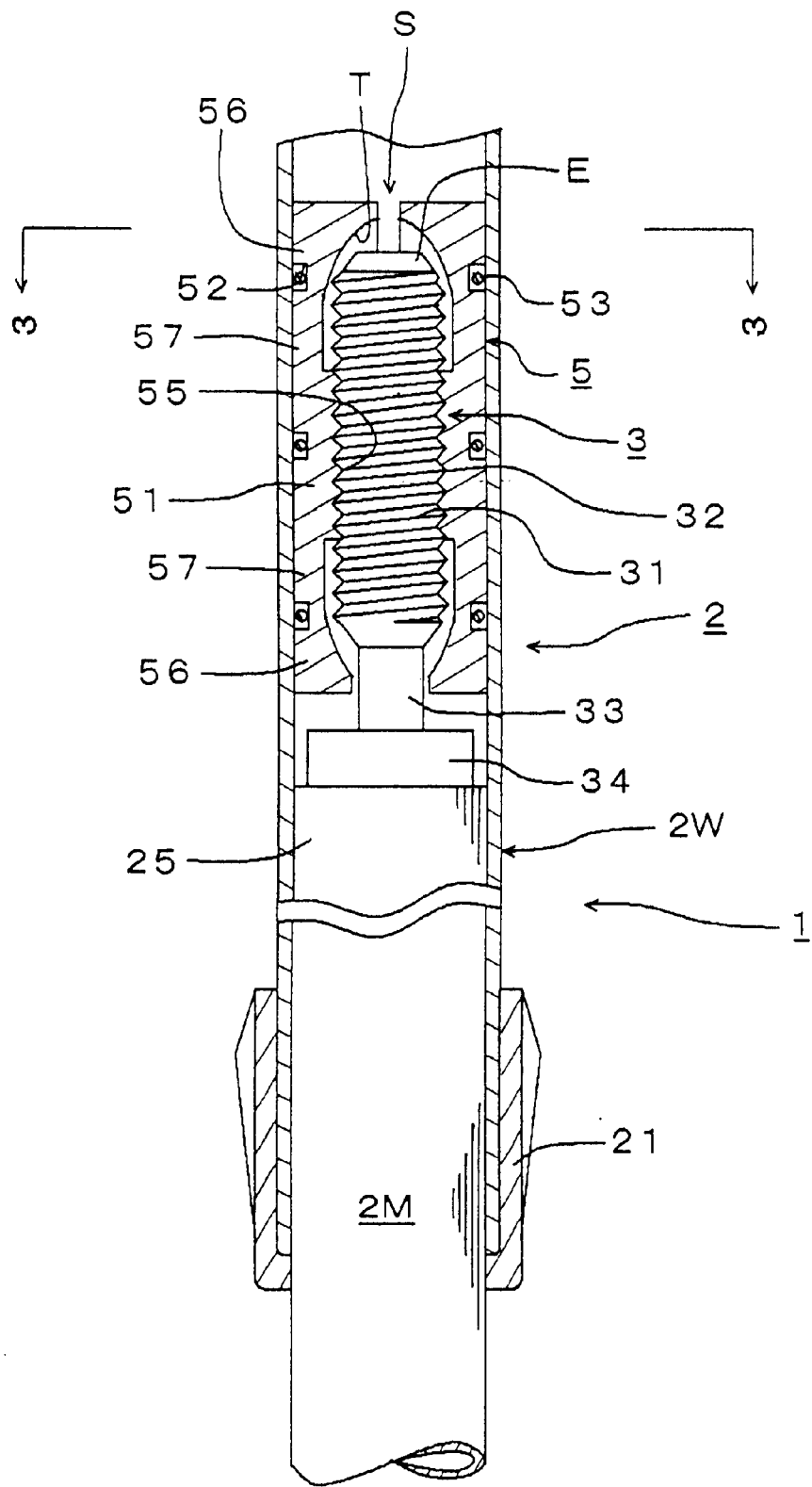
FIG. 3 is a sectional assembled view of the adjusting/locating device of the present invention.

Referring to FIGS. 2 and 3, the device of the present invention is composed of a screw member 3 and a locking member 5 disposed at the mother fitting tube 2W and the daughter fitting tube 2M of the upper, middle and lower fitting tubes 2A, 2B and 2C. The screw member 3 as shown in FIG. 2 can be a thread rod 31 made of resin material and formed with outer thread 32. The lower end of the threaded rod 31 is integrally connected with a cylindrical fixing section 34 through a connecting sect ion 33. The fixing section 34 is inserted into an insertion end 25 of the daughter fitting tube 2M. The upper and lower end faces of the threaded rod 31 are formed with opposite frustoconical surfaces E converging in a direction away from the center of the threaded rod 31.

As shown in FIG. 2, the locking member 5 is a cylindrical body composed of two semicylindrical bodies 51 made of highly elastic resin such as ABS. One side of each semicylindrical body 51 is connected with the other via connecting plates R. The outer circumference of the locking member 5 is formed with multiple annular grooves 52 in which a fastening ring 53 is fixedly inlaid. The inner circumferential faces of the two semicylindrical bodies 51 are formed with inner threads 55 corresponding to those of the threaded rod 31. The upper and lower ends of the inner threads 55 are formed with thick sections 56 converging from thin sections 57. The inner wall faces of the thick sections 56 are formed with semielliptic arch faces T. In addition, the end face of each thick section 56 is cut with an axial split S.

When assembled, the fixing section 34 of the screw member 3 is inserted into the top insertion end 25 of the daughter fitting tube 2M and located therein by tight fit, whereby when rotating the daughter fitting tube 2M, the screw member 3 is simultaneously rotated. Then the opposite faces 58 of the two semicylindrical bodies 51 of the locking member 5 are mated with the threaded rod of the screw member 3. The fastening ring 53 is fitted in the annular groove 52 to retain the two semicylindrical bodies 51. Then, the groove assembled locking member 5, screw member 3 and the daughter fitting tube 2M are fitted into the collar 21 of the mother fitting tube 2W with the outer circumferential faces of the semicylindrical bodies 51 slightly contacting with the inner wall face of the mother fitting tube 2W as shown in FIG. 3.

Figure 4A:
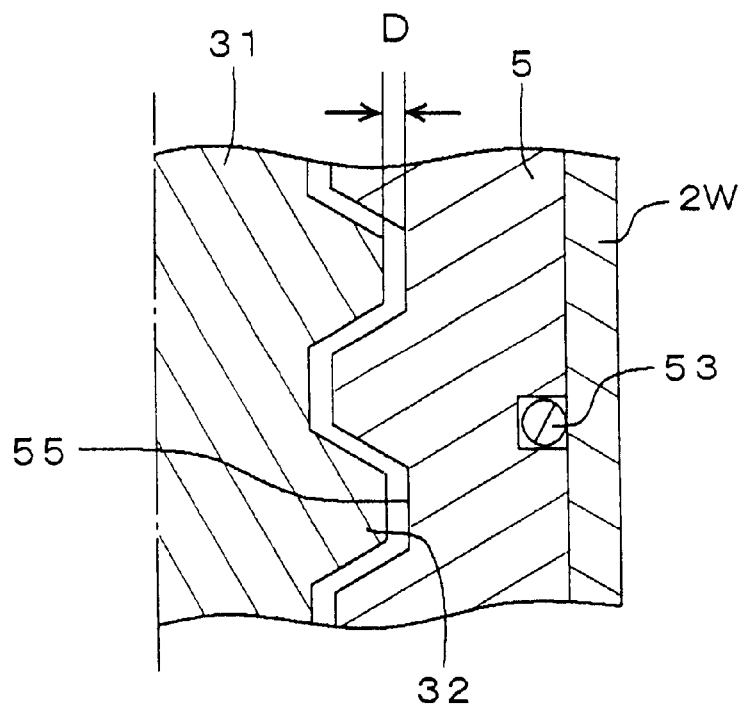
FIGS. 4a to 4c are sectional views of a part of the present invention, respectively showing the operation of the present invention.
Figures 4B, 4C:
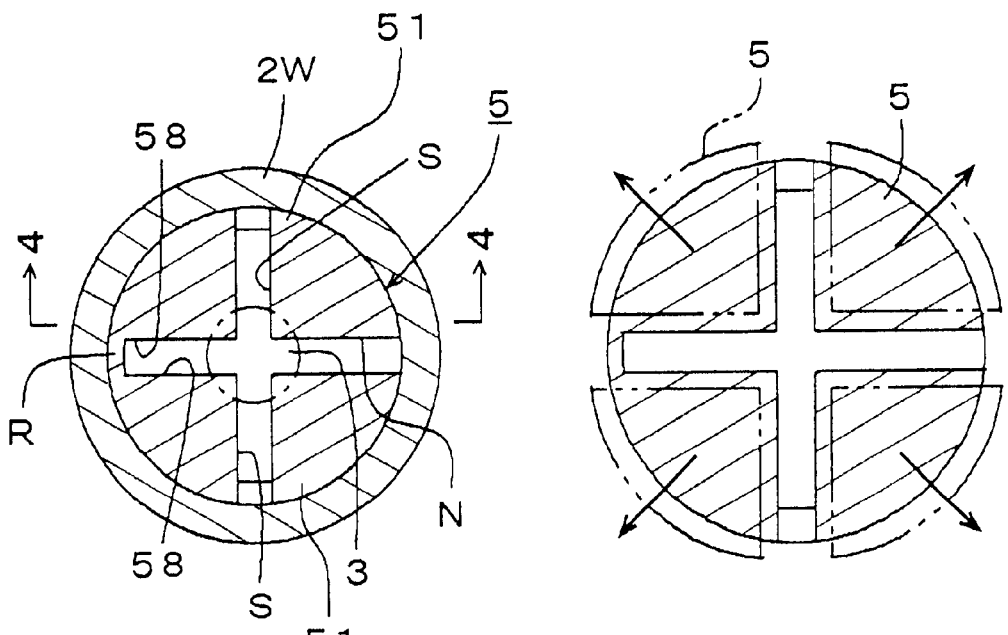
Figure 5:
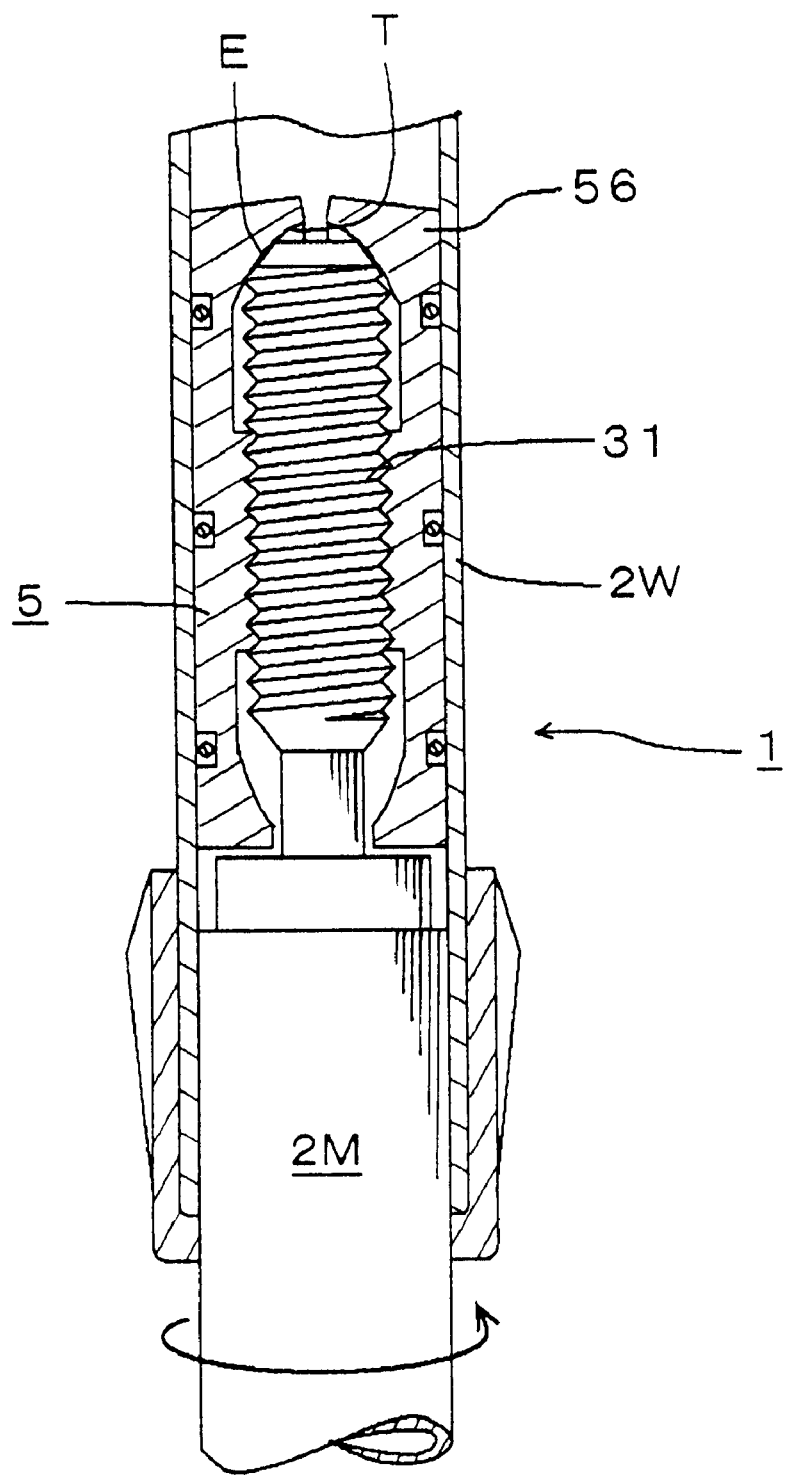
FIG. 5 is a sectional view showing that the present invention is rotated rightward.
Figure 6:
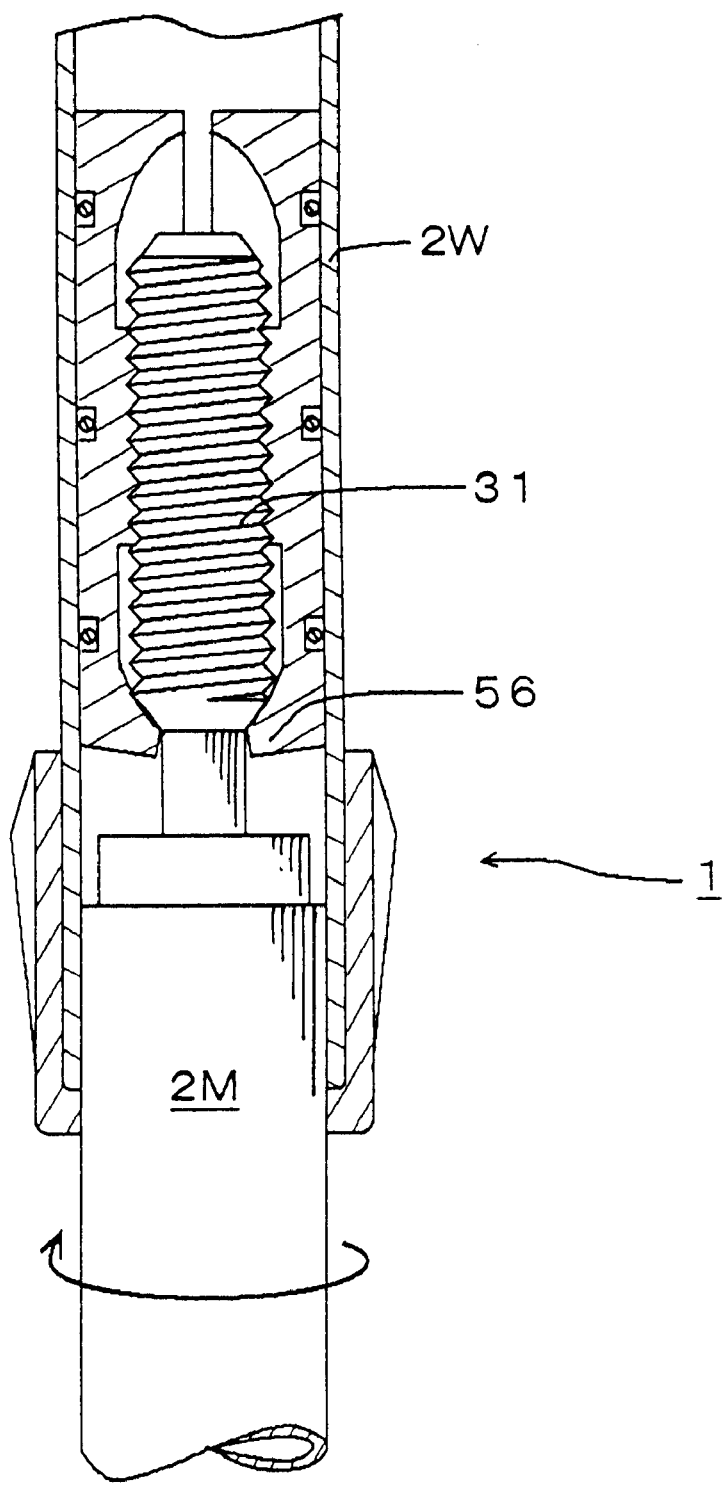
FIG. 6 a sectional view showing that the present invention is rotated leftward.

Referring to FIGS. 4a to 4c, 5 and 6, when mating the locking member 5 with the screw member 3, in order to prevent the screw member 3 from failing to smoothly rotate or being clogged due to too tight fit between the inner thread 55 and the outer thread 32, a certain gap is preserved. Preferably, the inner and outer threads 55, 32 are trapezoidal threads so that a maximum fastening effect can be achieved by a minimum application force as shown in FIG. 4a. When none of the upper, middle and lower fitting tubes 2A, 2B, 2C is rotated, the daughter fitting tube 2M can be freely moved within the mother fitting tube 2W to adjust the length of the stick as necessary. However, once the daughter fitting tube 2M is rotated, the screw member 3 inserted in the insertion end 25 thereof will be driven and screwed to move upward. At this time, the two semicylindrical bodies 51 of the locking member 5 in the mother fitting tube 2W are tightened by the frustoconical surface E of one end of the threaded rod 31. Accordingly, the thick sections 56 of the semicylindrical bodies 51 are gradually stretched open as shown in FIGS. 4b and 4c. Therefore, the two semicylindrical bodies 51 are expanded to abut against the inner circumferential face of the mother fitting tube 2W so as to firmly fix the daughter fitting tube 2M in the mother fitting tube 2W. Therefore, all the fitting tubes 2A, 2B and 2C are restricted from moving. According to the above measure, with respect to both a right-handed user and a left-handed user, by means of rotating the mother and daughter fitting tubes 2W and 2M relative to each other, the screw member 3 can stretch open the locking member 5 to tightly abut against the inner face of the mother fitting tube 2W so as to adjustably locate the daughter fitting tube 2M.

Figure 7A:
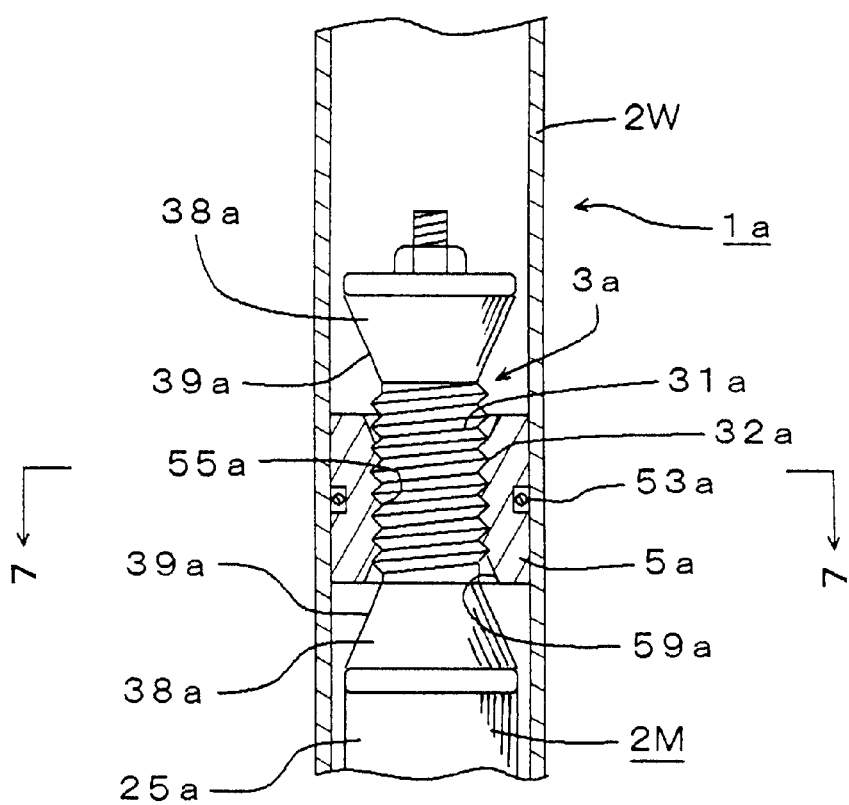
FIGS. 7a to 7c are sectional views of a part of another embodiment of the present invention.
Figure 7B:
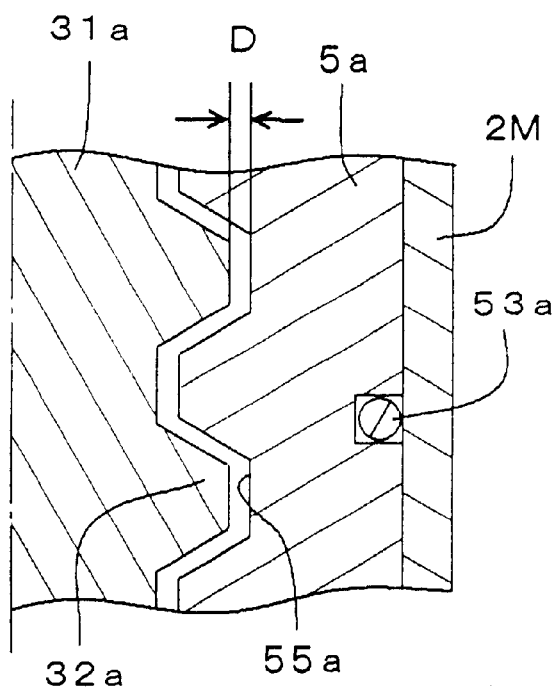
Figure 7C:
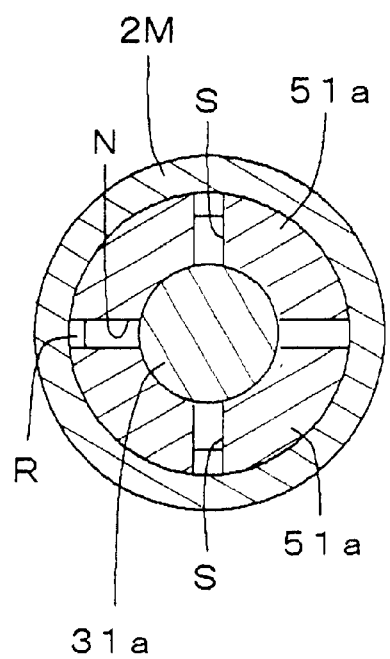
Figure 8A:
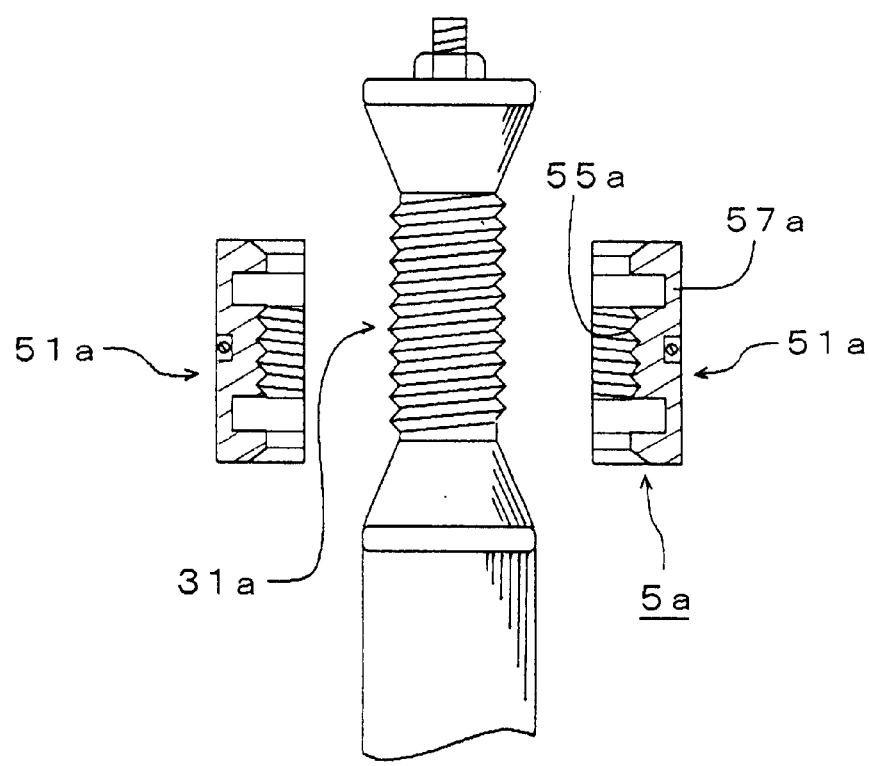
FIGS. 8a and 8b are sectional views of other embodiments of the present invention.
Figure 8B:
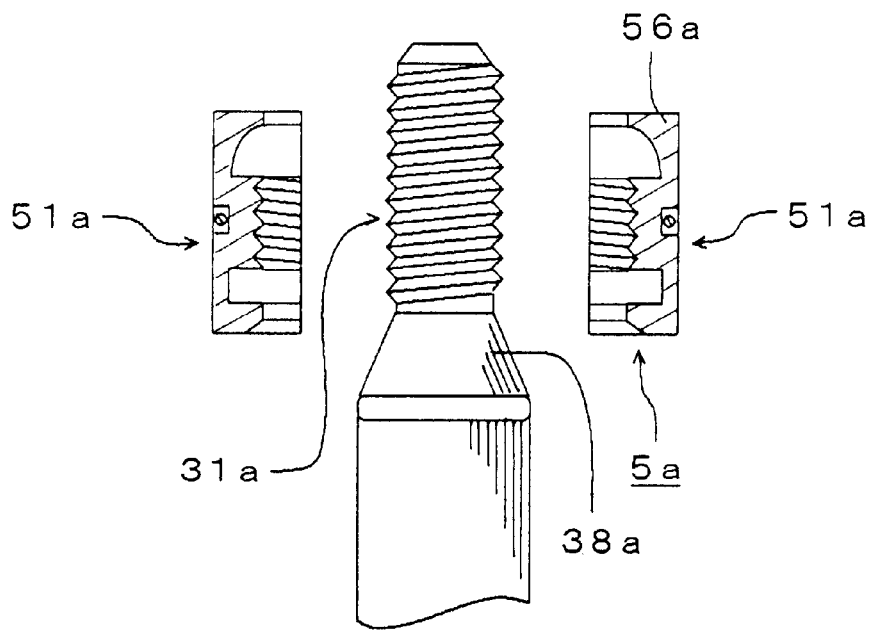

FIGS. 7a to 7c and 8a and 8b show other embodiments of the screw member 3 and locking member 5 of the present invention. In FIG. 7a, the screw member 3a still has a threaded rod 31a formed with outer thread 32a. The upper and lower ends of the threaded rod 31a are integrally formed with diverging large diameter sect ions 38a having conic faces 39a. The length of the semicylindrical bodies 51 a of the locking member 5a are shortened to only cover and mate with the threaded rod 31a. The outer circumferential faces of the semicylindrical faces of the semicylindrical bodies 51 a are formed with annular grooves 52a in which a fastening ring 53a is fixedly inlaid. The inner circumferential faces of the semicylindrical bodies 51a are formed with inner threads 55a corresponding to the threaded rod 31a of the screw member 3a. Two ends of the inner threads 55a are formed with slope faces 59a cooperating with the large diameter sections 38a. According to such arrangement, by means of rotating the screw member 3a, any of the large diameter sections 38a of two ends of the screw member 3a will abut against the slope faces 59a of two ends of the semicylindrical bodies 51a so as to expand the locking member 5a to tightly abut against the inner circumferential face of the mother fitting tube 2W. Therefore, the daughter fitting tube 2M is adjustably located in the mother fitting tube 2W. The semicylindrical bodies 51a of the locking member 5a can be modified fled as shown in FIGS. 8a and 8b. The modified semicylindrical bodies 51a still cooperate with the screw member 3a with specific large diameter sections 38a to achieve the adusting/locating effect for various kinds of sticks.

According to the above arrangement, after the fitting tubes of the stick are adjusted in length, a user can hold the daughter fitting tube and rotate the same with a hand so to locate the daughter fitting tube. This can be easily achieved by both right-handed users and left-handed users. In addition, such structure is simple and can be easily assembled.

The above embodiments are only used to illustrate the present invention, not intended to limit the scope thereof. Many modifications of the above embodiments can be made without departing from the spirit of the present invention.

What is claimed is:

1. Stageless adjusting/locating device for a stick, the stick being composed of multiple telescopic fitting tubes including at least one mother fitting tube and at least one daughter fitting tube nested in the mother fitting tube, the adjusting/locating device being disposed between the mother and daughter fitting tubes for adjusting a position of the daughter tube relative to the mother tube and for locking the daughter tube in the adjusted position, said adjusting/locating device comprising:

a screw member which is a threaded rod having an outer circumferential face formed with an outer thread and upper and lower end faces, a lower end of the threaded rod being integrally connected with a cylindrical fixing section which is inserted into an insertion end of the daughter fitting tube, the upper and lower end faces of the threaded rod being formed with frustoconical surfaces converging in a direction away from the center of the threaded rod; and a locking member which is composed of two semicylindrical bodies, adjacent sides of the semicylindrical bodies being connected with each other via connecting plates, an outer circumferential face of the locking member being formed with multiple annular grooves in which a fastening ring is fixedly inlaid, inner circumferential faces of the two semicylindrical bodies being formed with inner threads, an upper end and a lower end of the inner threads being formed with thick sections converging from thin sections, inner wall faces of the thick sections being formed with semielliptic arch faces arranged to be engaged by a respective one of said frustoconical surfaces upon rotation of said daughter fitting tube in either a clockwise or counterclockwise direction, the respective one of said frustoconical surfaces thereby causing the locking member to expand the locking member so as to tightly abut against the inner circumferential face of the mother fitting tube and thus adjustably locate the daughter fitting tube.

2. Stageless adjusting/locating device for sticks as claimed in claim 1, wherein each end face of each semicylindrical body is cut with an axial split.

3. Stageless adjusting/locating device for a stick, the stick being composed of multiple telescopic fitting tubes including at least one mother fitting tube and at least one daughter fitting tube nested in the mother fitting tube, the adjusting/locating device being disposed between the mother and daughter fitting tubes for adjusting a position of the daughter tube relative to the mother tube and for locking the daughter tube in the adjusted position, said adjusting/locating device comprising:

a screw member which is a threaded rod having an outer circumferential face formed with outer thread and upper and lower end faces, a lower end of the threaded rod being integrally connected with a cylindrical fixing section which is inserted into an insertion end of the daughter fitting tube, the upper and lower end faces of the threaded rod being formed with diverging large diameter sections having frustoconical surfaces; and the a locking member which is composed of two semicylindrical bodies, the adjacent sides of the semicylindrical bodies being connected with each other via connecting plates, an outer circumferential face of the locking member being formed with multiple annular grooves in which a fastening ring is fixedly inlaid, inner circumferential faces of the two semicylindrical bodies being formed with inner threads, two ends of the inner threads being formed with slope faces arranged to cooperate with the diverging large diameter sections of the threaded rod to cause the slope faces of the inner threads to be engaged by a respective one of said frustoconical surfaces upon rotation of said daughter fitting tube in either a clockwise or counterclockwise direction, the engagement between a respective slope face and a corresponding one of said frustoconical surfaces thereby causing the threaded rod to expand the locking member so as to tightly abut against the inner circumferential face of the mother fitting tube and thus adjustably locate the daughter fitting tube.

* * * * *